United States Patent
Barber et al.

(10) Patent No.: US 11,526,627 B2
(45) Date of Patent: Dec. 13, 2022

(54) DATA DISCOVERY AND GENERATION OF LIVE DATA MAP FOR INFORMATION PRIVACY

(71) Applicant: DataGrail, Inc., San Francisco, CA (US)

(72) Inventors: Daniel Barber, San Francisco, CA (US); Earl Hathaway, Pacifica, CA (US); Ignacio Zendajas, San Jose, CA (US)

(73) Assignee: DataGrail, Inc., San Francisco, CA (US)

( * ) Notice: Subject to any disclaimer, the term of this patent is extended or adjusted under 35 U.S.C. 154(b) by 0 days.

(21) Appl. No.: 16/947,289

(22) Filed: Jul. 27, 2020

(65) Prior Publication Data

US 2022/0027512 A1    Jan. 27, 2022

(51) Int. Cl.
| | | |
|---|---|---|
| *H04L 29/06* | (2006.01) | |
| *G06F 21/62* | (2013.01) | |
| *G06F 21/60* | (2013.01) | |
| *H04L 9/40* | (2022.01) | |

(52) U.S. Cl.
CPC ........ *G06F 21/6254* (2013.01); *G06F 21/604* (2013.01); *G06F 21/6209* (2013.01); *H04L 63/0815* (2013.01)

(58) Field of Classification Search
CPC ............... G06F 21/6254; G06F 21/604; G06F 21/6209; H04L 63/0815
See application file for complete search history.

(56) References Cited

U.S. PATENT DOCUMENTS

| | | | |
|---|---|---|---|
| 8,595,499 B2 | 11/2013 | Haider et al. | |
| 9,483,535 B1 | 11/2016 | Coyle et al. | |
| 11,157,652 B2* | 10/2021 | Basava | G06F 16/2379 |
| 2012/0259782 A1 | 10/2012 | Hammad | |
| 2015/0095968 A1 | 4/2015 | Steiner et al. | |
| 2017/0287036 A1 | 10/2017 | Barday | |
| 2017/0324586 A1 | 11/2017 | Kim et al. | |
| 2018/0159900 A1 | 6/2018 | Barday | |
| 2018/0183803 A1 | 6/2018 | Singh et al. | |
| 2018/0302392 A1* | 10/2018 | Gordon | G06F 21/41 |
| 2018/0373890 A1 | 12/2018 | Barday et al. | |
| 2019/0286839 A1* | 9/2019 | Mutha | G06F 16/29 |
| 2019/0318122 A1 | 10/2019 | Hockey et al. | |
| 2019/0340613 A1 | 11/2019 | Ghosh et al. | |
| 2019/0392173 A1 | 12/2019 | Brannon et al. | |
| 2019/0392176 A1* | 12/2019 | Taron | G06F 21/6254 |

(Continued)

OTHER PUBLICATIONS

U.S. Appl. No. 16/855,476, filed Apr. 22, 2020, Barber et al.

(Continued)

*Primary Examiner* — Vance M Little
(74) *Attorney, Agent, or Firm* — Weaver Austin Villeneuve & Sampson LLP

(57) ABSTRACT

Systems and methods for discovering data related to information privacy are described. A server computing system may receive data from a first computing system, the first computing system verified to store personal information of customers of an entity. The server computing system may associate a second computing system with the entity based on the data from the first computing system referencing the second computing system. The server computing system may generate a live data map for the entity, the live data map configured to include at least information about whether the first computing system and the second computing system store the personal information of the customers of the entity, the live data map used to search for the personal information in response to personal information verification requests received by the entity.

48 Claims, 13 Drawing Sheets

(56) References Cited

U.S. PATENT DOCUMENTS

| | | | |
|---|---|---|---|
| 2020/0050792 | A1 | 2/2020 | Barday et al. |
| 2020/0057864 | A1* | 2/2020 | Parthasarathy ... G06F 16/24578 |
| 2020/0167501 | A1 | 5/2020 | Brannon et al. |
| 2020/0204545 | A1* | 6/2020 | Pacella .................. G06F 21/32 |
| 2020/0233977 | A1* | 7/2020 | Chickerur ........... G06F 21/6254 |
| 2020/0387637 | A1* | 12/2020 | Koren ................. H04L 63/0245 |
| 2021/0141929 | A1 | 5/2021 | Hydro et al. |
| 2021/0204116 | A1 | 7/2021 | Naujok et al. |
| 2021/0334401 | A1 | 10/2021 | Barber et al. |
| 2021/0334407 | A1* | 10/2021 | North .................... G06F 16/248 |
| 2022/0067130 | A1 | 3/2022 | Dabbs |
| 2022/0129586 | A1 | 4/2022 | Barber et al. |

OTHER PUBLICATIONS

International Search Report and Written Opinion dated Jul. 7, 2021 issued in Application No. PCT/US2021/028561.
International Search Report and Written Opinion dated Oct. 18, 2021 issued in Application No. PCT/US2021/043188.
U.S. Appl. No. 16/949,411, filed Oct. 28, 2020, Barber et al.
U.S. Non-Final Office Action dated Mar. 29, 2022, in U.S. Appl. No. 16/855,476.
U.S. Non-Final office Action dated Sep. 2, 2022 in U.S. Appl. No. 16/949,411.
U.S. Notice of Allowance dated Jul. 27, 2022 in U.S. Appl. No. 16/855,476.

* cited by examiner

750

710

| Third-Party System | Personal Information | Status | Function |
|---|---|---|---|
| Okta | Found | Connected | IT |
| Marketo | Found | Not Connected | Marketing |
| NoreDink | Not Found | Not Connected | Online Learning |
| AWS | Found | Connected | Engineering |
| MailChimp | Found | Connected | Marketing |

*FIG. 7B*

DATA DISCOVERY AND GENERATION OF LIVE DATA MAP FOR INFORMATION PRIVACY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to discovering data related to information privacy.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

In general, information privacy relates to the privacy of personal information and may be associated with the collection, storing, use, and sharing of the personal information. The personal information may be collected with knowledge of the subjects and may include information that is not publicly available. There are privacy laws that provide the subjects of the personal information the rights to request for the information, to have their information removed, to control the sale of their data, and to prohibit the disclosure or misuse of the personal information, amongst other rights. Companies that collect information from their customers therefore are required to provide the information when requested. For example, in California, the privacy law requires that websites that collect user data to disclose the type of information being collected, the types of third parties they might provide that information to, among others. It can be difficult for a company to comply with the request for information when the company does not even know what information it has collected.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

FIG. 7B shows an example live data map, in accordance with some implementations.

DETAILED DESCRIPTION

Figure 1:
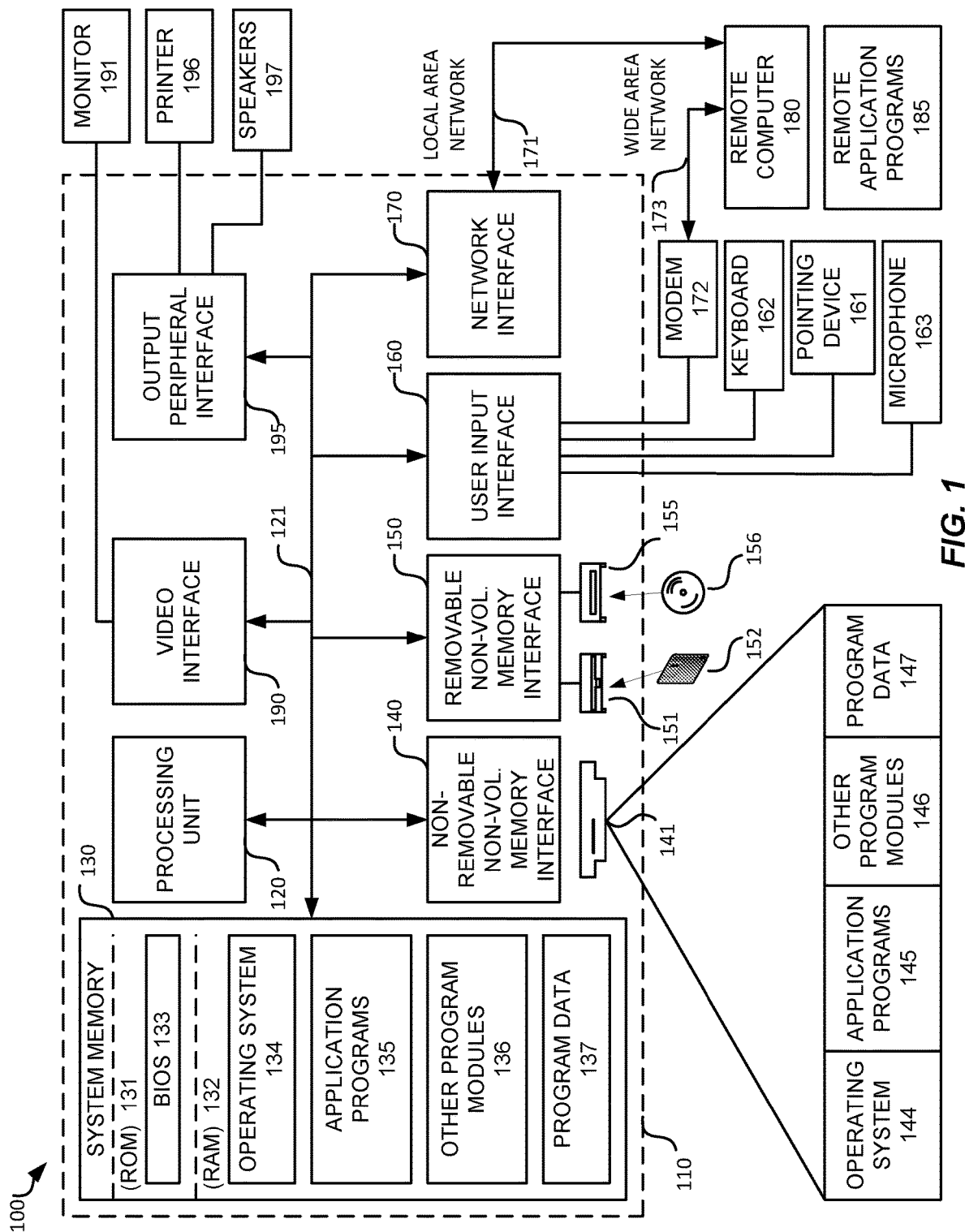
FIG. 1 shows a diagram of an example computing system that may be used with some implementations.

Examples of systems and methods associated with data discovery and with maintaining a live data map as related to information privacy will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a computer-implemented method for performing data discovery and maintaining a live data map may include receiving, by a server computing system, data from a first computing system, the first computing system verified to store personal information of customers of an entity; associating, by the server computing system, a second computing system with the entity based on the data from the first computing system referencing the second computing system; and generating, by the server computing system, a live data map for the entity, the live data map configured to include at least information about whether the first computing system and the second computing system store the personal information, the live data map used to search for the personal information in response to personal information verification requests received by the entity.

The disclosed implementations may include a system for performing data discovery and maintaining a live data map as related to information privacy and may include one or more processors, and a non-transitory computer readable medium storing a plurality of instructions, which when executed, cause the one or more processors of a server computing system to receive data from a first computing system, the first computing system verified to store personal information of customers of an entity; associate a second computing system with the entity based on the data from the first computing system referencing the second computing system; and generate a live data map for the entity, the live data map configured to include at least information about whether the first computing system and the second computing system store the personal information, the live data map used to search for the personal information in response to personal information verification requests received by the entity.

The disclosed implementations may include a computer program product comprising computer-readable program code to be executed by one or more processors of a server computing system when retrieved from a non-transitory computer-readable medium, the program code including instructions to receive data from a first computing system, the first computing system verified to store personal information of customers of an entity; associate a second computing system with the entity based on the data from the first computing system referencing the second computing system; and generate a live data map for the entity, the live data map configured to include at least information about whether the first computing system and the second computing system store the personal information, the live data map used to search for the personal information in response to personal information verification requests received by the entity.

While one or more implementations and techniques are described with reference to performing data discovery and maintaining a live data map related to information privacy implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. The term "database" as used herein may refer to any organized collection of data.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, personal information may include information that is shared by or collected from an individual with knowledge of the individual. It may be noted that the definition of personal information may vary depending on the governing agency. For example, the California Consumer Privacy Act ("CCPA") Section 1798.140(o)(1) defines personal information as information that identifies, relates to, describes, is reasonably capable of being associated with, or could reasonably be linked, directly or indirectly, with a particular consumer or household. The CCPA indicates that personal information may include identifiers such as a real name, alias, postal address, unique personal identifier, online identifier, internet protocol address, email address, account name, social security number, driver's license number, passport number, or other similar identifiers. Personal information may include biometric information, Internet or other electronic network activity information, including, but not limited to, browsing history, search history, and information regarding a consumer's interaction with an internet website, application, or advertisement, geolocation data, professional or employment-related information, and education information, among others. According to the EU's General Data Protection Regulation (GDPR) Article 4, 'Personal data' means any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. Furthermore, the GDPR only applies to personal data processed in one of two ways: personal data processed wholly or partly by automated means (or, information in electronic form); and personal data processed in a non-automated manner which forms part of, or is intended to form part of, a 'filing system' (or, written records in a manual filing system).

Section 1798.100 (a) of the CCPA also indicates that a consumer shall have the right to request that a business that collects a consumer's personal information disclose to that consumer the categories and specific pieces of personal information the business has collected. This may create many challenges that need to be addressed by the businesses because non-compliance may result in civil actions or civil penalties. In addition, when a business is found to be non-compliant, correction action may need to be performed within a narrow period of time after being notified of the non-compliance. Furthermore, some businesses may use so many different databases and other systems that they have difficulty identifying what information they have collected and where the collected information is stored. As such, having a system to help responding to the consumers' requests and managing the collected personal information is beneficial for accurate and timely response.

FIG. 1 is a diagram of an example computing system that may be used with some implementations. In diagram 100, computing system 110 may be used by a user to establish a connection with a server computing system. The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

FIG. 1 includes a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
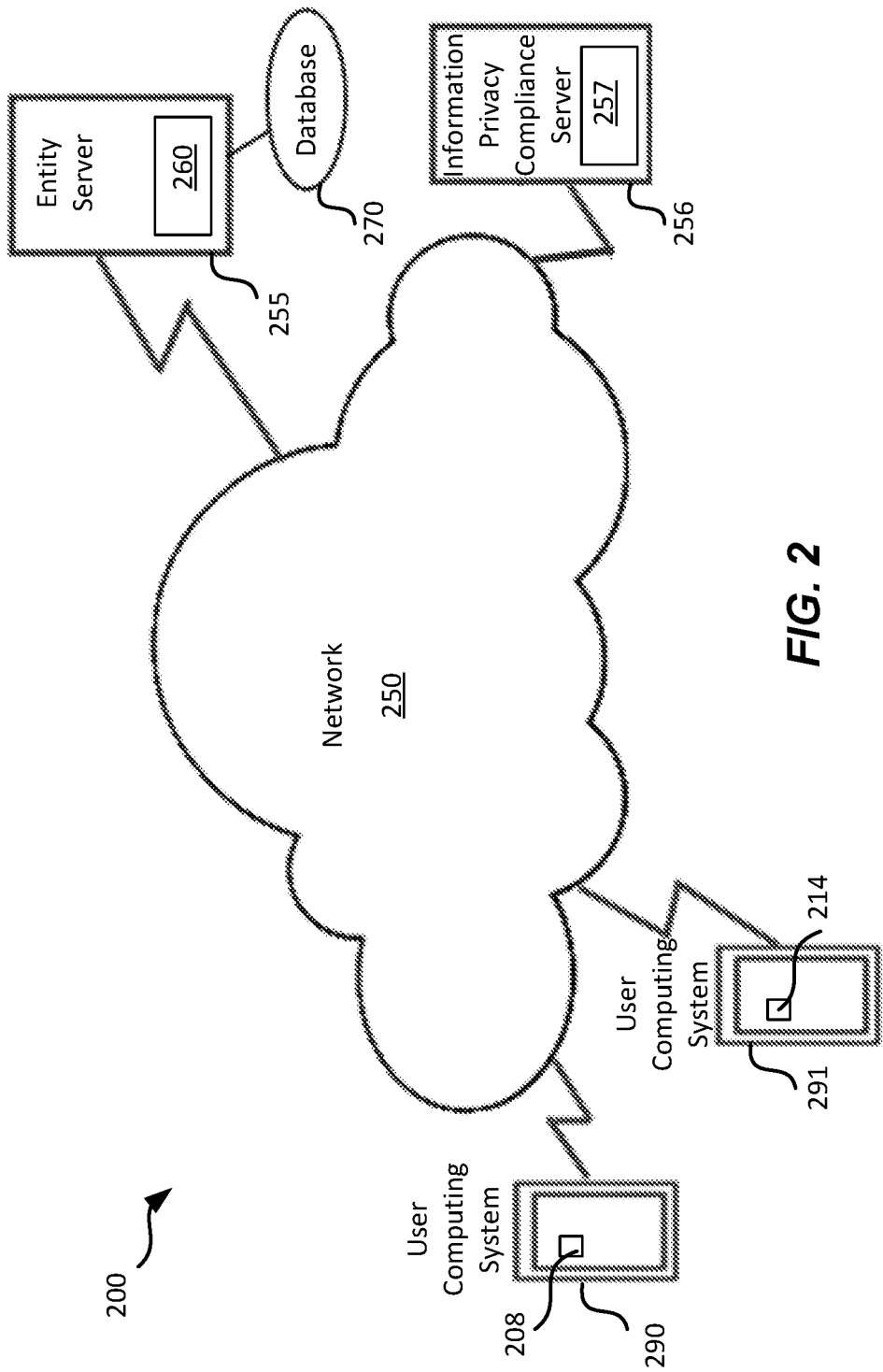
FIG. 2 shows a diagram of an example network environment that may be used with some implementations.

FIG. 2 shows a diagram of an example network environment that may be used with some implementations. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 256 via the network 250.

The server computing system 255 (also referred to as an entity server) may be coupled with database 270 and may be associated with an entity. The entity may be an organization or a business that has legally collected and stored personal information from many consumers. For example, CCPA Section 1798.140(c)(1) defines a business as a sole proprietorship, partnership, limited liability company, corporation, association, or other legal entity that is organized or operated for the profit or financial benefit of its shareholders or other owners that collects consumers' personal information or on the behalf of which that information is collected and that alone, or jointly with others, determines the purposes and means of the processing of consumers' personal information, that does business in the State of California within certain thresholds.

Each of the computing systems 290 and 291 may include an application module such as module 208 or 214. For example, a user may use the computing system 290 and the application module 208 (e.g., browser application) to login to a web application 260 hosted by the entity server 255. The user may engage in transactions with the web application 260 and may provide consent to enable personal information of the user to be collected by the web application 260. The personal information may be stored in the database 270. For example, a transaction may be a registration operation such as when the user registers with the web application 260, or the transaction may involve purchase and payment operations such as when the user places an item into an online shopping cart and checks out by paying with a credit card.

The server computing system 256 (also referred to as information privacy compliance server) may be coupled with the entity server 255 and may include information privacy compliance application 257. The information compliance application 257 may be configured to operate on behalf of an entity associated with the entity server 255 to enable the entity to stay in compliance with privacy laws. One of the computing systems 290 and 291 may be used to initiate a request for personal information to the entity server 255. For some implementations, the personal information request may be received and processed by the information privacy compliance server 256. For some implementations, the information privacy compliance server 256 may be configured to use a live data map to generate a verification report in response to the personal information request. A live data map may include information about systems that may store the personal information on behalf of an entity.

Figure 3:
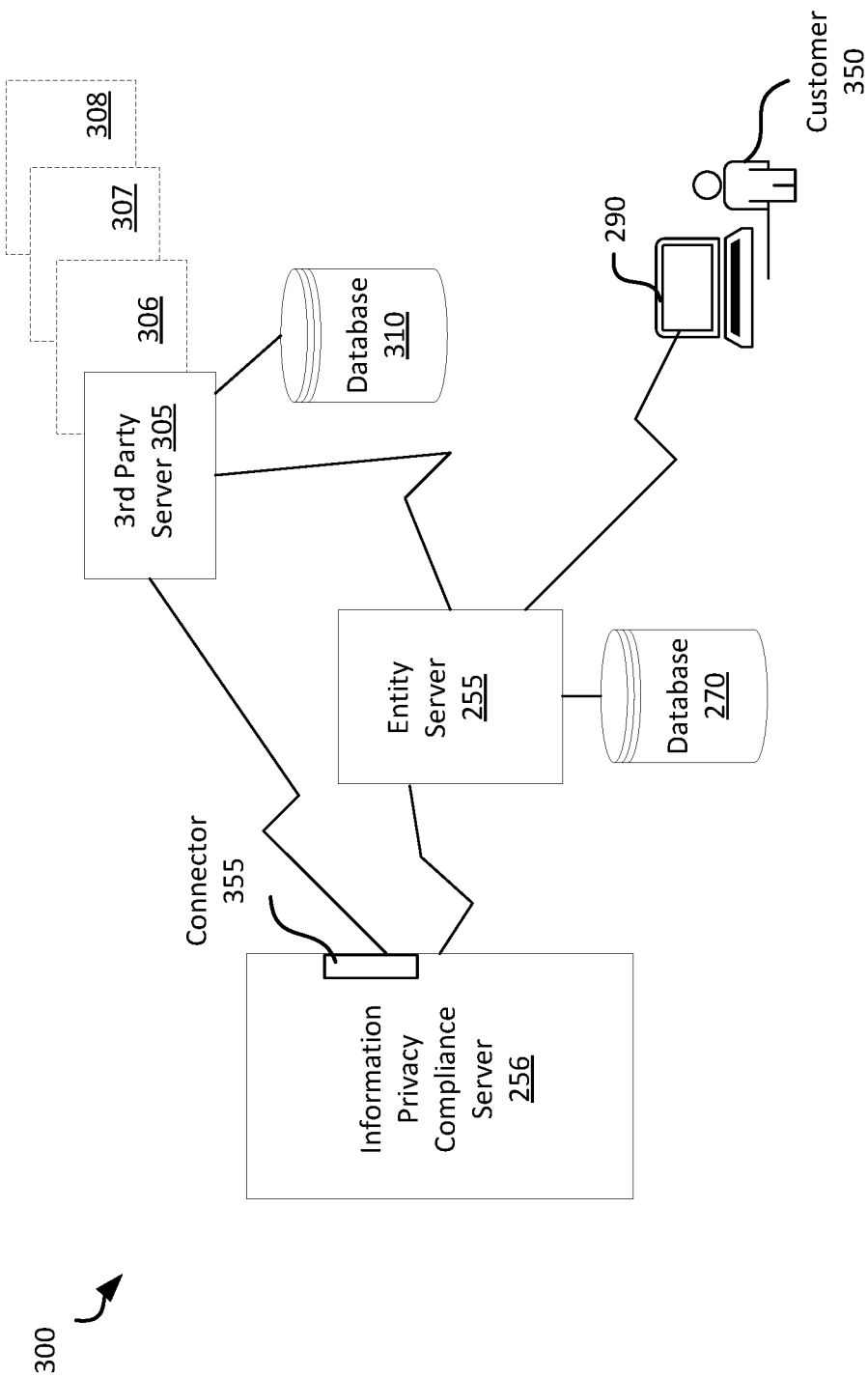
FIG. 3 shows an example diagram that includes a span of databases or systems where personal information may be stored, in accordance with some implementations.

FIG. 3 shows an example diagram that includes a span of databases or systems where personal information may be stored, in accordance with some implementations. Diagram 300 includes an information privacy compliance server 256, an entity server 255 associated with an entity, a third-party server 305 associated with the entity, and a customer 350 of the entity.

For some implementations, the entity server 255 may be associated with one or more third-party servers configured to perform services on behalf of the entity. For example, besides being associated with the third-party server 305, the entity server 255 may also be directly or indirectly associated with the third party-servers 306, 307 and 308. For example, the entity server 255 may be associated with the third-party server 305, and the third-party server 305 may be associated with the third-party server 306. One or more connectors 355 may be used to connect to a third-party server.

The entity server 255 may communicate with, send data to or receive data from one or more of the third-party servers 305, 306, 307 and 308. It's possible that a third-party server is associated with a service provider. For example, the entity may be an online furniture business, and it may be associated with an email marketing service to perform marketing campaign on its behalf. In this example, the furniture business may be associated with the entity server 255, and the email marketing service may be associated with the third-party server 305. The email marketing service may send marketing emails on behalf of the furniture business using a list of contacts provided by the furniture business. The list of contacts may be stored in a database (e.g., database 270) associated with the furniture business. The list of contacts may be considered as one set of personal information.

When the customer 350 interacts with an email from the email campaign, the email marketing service may collect personal information about the customer 350 including, for example, the device (e.g., IP address, OS information, browser information, etc.) used by the customer 350 and the interaction (e.g., browsing activities, etc.) by the customer 350. Cookies and tracking technologies may be used, and the collected information about the customer 350 may be stored by the email marketing service in the database 310 on behalf of the furniture business. The information collected by the email marketing service may be considered another set of personal information attributed to the furniture business. As such, the personal information collected and stored on behalf of the furniture business may be stored in the database 270 and in the database 310.

It may be possible that the email marketing service in this example may store some contact information in its own database, and it may be associated with a third-party customer relationship management (CRM) system where the contact information may be communicated to the CRM system. As a result, it may be possible that personal information associated with the customers of an entity may be stored across multiple databases or database systems, and data discovery operations may need to be performed to identify where the information is stored so that an accurate verification report may be provided. For some implementations, the content of the verification report may vary depending on the applicable law or regulation. For example, according to the CCPA, the verification report may only need to include personal information collected by the entity. However, according to the GDPR, the verification report may need to include all personal information in possession of the entity. For some implementations, when there is a change to the definition of personal information or personal data by the governing agency, the verification report may be updated accordingly. Verification requests may be submitted by customers of the entity to request for the personal information that the entity may have access to. For example, the website of the furniture business may be hosted by another third-party service, and content of shopping carts of its customers may be stored in a database of this other third-party service. The third-party service may be implemented based on a software as a service (SaaS) platform where the applications and files associated with the website of the furniture business may be stored on the third-party server and associated database.

Figure 4:
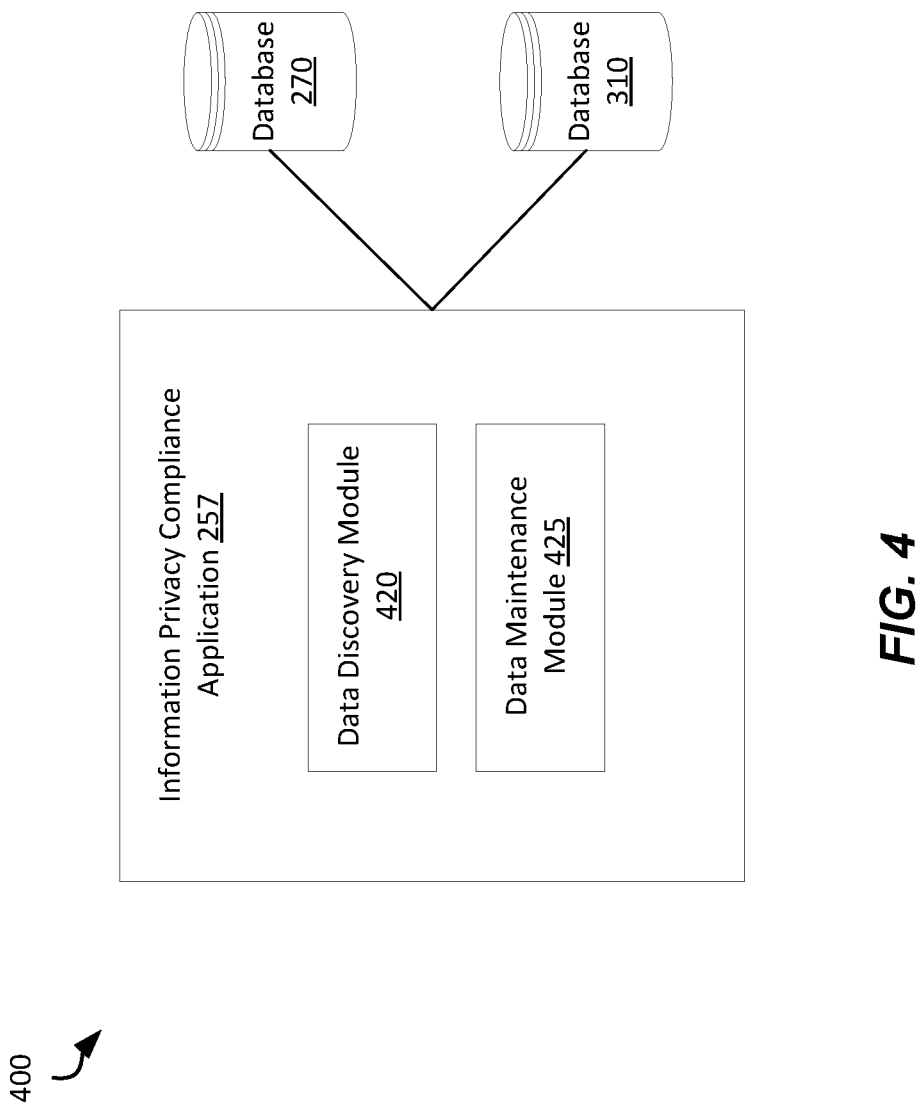
FIG. 4 shows an example diagram of an information privacy compliance application with its data discovery and maintenance functions, in accordance with some implementations.

FIG. 4 shows an example diagram of an information privacy compliance application with its data discovery and maintenance functions, in accordance with some implementations. In diagram 400, the information privacy compliance application 257 may be configured to include data discovery module 420 and data maintenance module 425.

For some implementations, the data discovery module 420 may be configured to determine where the entity stores the personal information that it collects from its customers. It may be noted that the entity may store the information it collects from its customers in more than one location. This may include the personal information that is collected and stored on behalf of the entity by one or more third-party services. The data discovery module 420 may be configured to communicate with the entity server 255 and the third-party server 305.

For some implementations, the data maintenance module 425 may be configured to maintain the personal information discovered by the data discovery module 420 so that the personal information may be continuously refreshed. For example, a customer may submit a request to correct the personal information that the entity may currently have about the customer. The information submitted by the customer may then be received and processed by the data maintenance module 425.

Figure 5A:
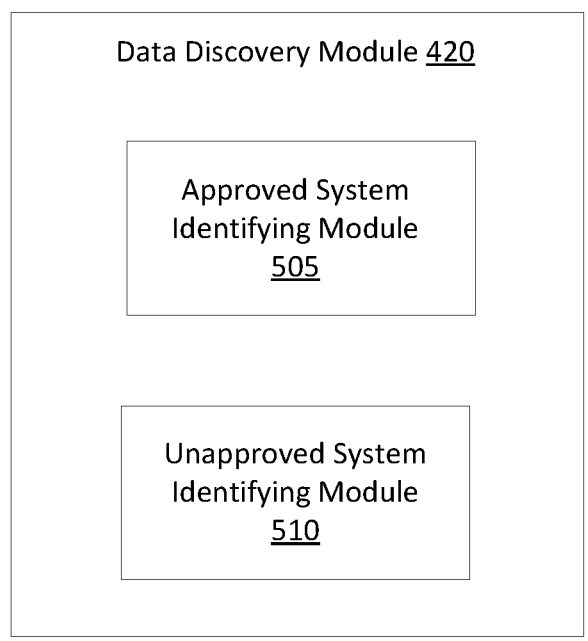
FIG. 5A shows an example diagram of a data discovery module with its third-party service identifying operations, in accordance with some implementations.

FIG. 5A shows an example diagram of a data discovery module with its third-party service identifying operations, in accordance with some implementations. In diagram 500, the data discovery module 420 may be configured to include an approved system identifying module 505 and an unapproved system identifying module 510. The approved system identifying module 505 may be configured to identify third-party services that have been formally approved by the entity and communicated with by the entity server 255 (shown in FIG. 3). For example, an information technology (IT) department of the entity may have reviewed and established an approved list of third-party services that various groups in the entity may use. The unapproved system identifying module 510 may be configured to determine third-party services that may be used by the entity and communicated with by the entity server 255, even though those services may not have been approved by the entity. The third-party services determined by the approved system identifying module 505 and the unapproved system identifying module 510 may be grouped together in an inventory of third-party services associated with the entity. The inventory may be represented in a live data map 710 (as shown in FIG. 7B).

Figure 5B:
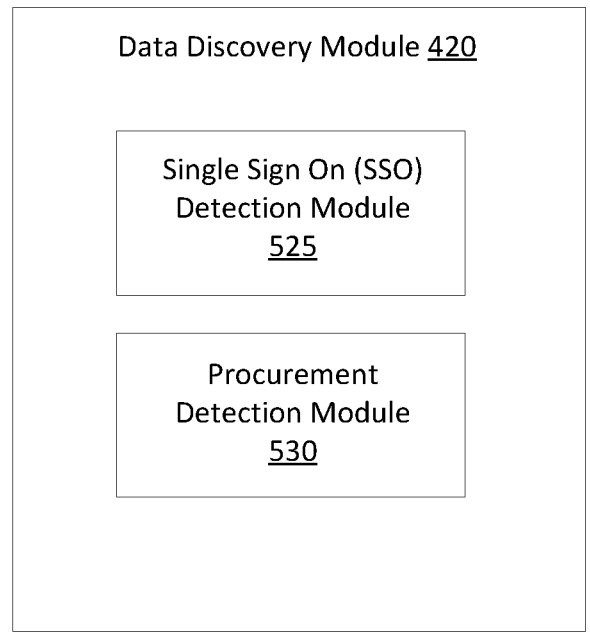
FIG. 5B shows an example diagram of a data discovery module with its single sign on (SSO) system detection operations, in accordance with some implementations.

FIG. 5B shows an example diagram of a data discovery module with its single sign on (SSO) system detection operations, in accordance with some implementations. It may be possible that users (e.g., employees) or an application associated with an entity may use a single sign on (SSO) authentication scheme to sign into multiple independent third-party services or systems with a single ID and password. For example, a user may use a Google SSO to access thousands of pre-integrated apps, both in the cloud and on-premises, with one click. Google SSO is a product of Google LLC of Menlo Park, Calif. Other examples of SSO include Microsoft SSO of Microsoft Inc of Redmond, Wash. and Okta SSO of Okta, Inc. of San Francisco, Calif. Okta also refers to itself as an identity provider (IdP).

For some implementations, the data discovery module 420 may be configured to include an SSO detection module 525 and a procurement detection module 530, as shown in diagram 550. The SSO detection module 525 may be configured to identify the SSOs used by users associated with an entity and to determine the third-party services or systems that each SSO may be associated with. For example, a user or an application associated with an entity may use an SSO to sign into a third-party system and communicate personal information with the third-party system.

The procurement detection module 530 may be configured to determine a payment or procurement systems that may be used by the entity for payments, payment management or expense management. For the example, an entity may use a payment management system such as Concur from SAP Concur of Bellevue, Wash. or Coupa from Coupa Software Inc. of San Mateo, Calif. When the payment or procurement system is determined, the procurement detection module 530 may be configured to determine third party services or systems that receives payment from the entity via the payment or procurement system. For example, a user or an application associated with an entity may communicate personal information to one or more third-party services that receives payment from the entity via the payment or procurement system. The third-party services determined by the SSO detection module 525 and the procurement detection module 530 may be added to the inventory of third-party services associated with an entity.

Figure 5C:
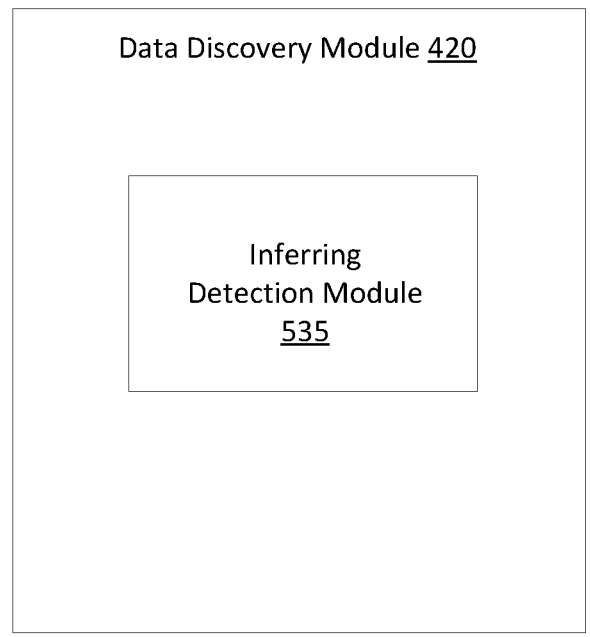
FIG. 5C shows an example diagram of a data discovery module with its inferring operations, in accordance with some implementations.

FIG. 5C shows an example diagram of a data discovery module with its inferring operations, in accordance with some implementations. When the third-party services or systems are identified using one or more of the operations described with FIG. 5A and FIG. 5B, the inference detection module 535 may be configured to determine additional third-party services or systems by inferring, as shown in diagram 575. For some implementations, when the inferring detection module 535 determines that one third-party service associated with an entity communicates with another third-party service not yet known to be associated with the entity, the inference detection module 535 may conclude that both third-party services belong in the inventory of third-party services associated with the entity.

For some implementations, a combination of discovery techniques may be used by the inference detection module 535 to enumerate what other systems a third-party system may communicate and exchange data with. The discovery techniques may be customized per third-party system and may include using application programming interface (API) made available by a third-party system. For example, some third-party systems such as Salesforce, may provide direct API support to enable enumerating what plugins (e.g., applications, packages) are installed in a particular instance. Thus, when a package named DiscoverOrg is discovered, inferences may be made that contact data may be exchanged with DiscoverOrg system by the entity. DiscoverOrg is a B2B contact lead company in Vancouver, Wash. The discovery techniques may also include examining data that is present in a third-party system and making inferences about other systems. Some third-party systems such as, for example, Salesforce (of San Francisco, Calif.), Marketo (of San Mateo, Calif.), and Hubspot (of Cambridge, Mass.) have objects which are a collection of named fields. The object may correspond to a user. The fields may be named descriptively to enable detection of other third-party systems. For example, with Salesforce, when a field is named DSCORGPKG_Company_HQ_Address_c, the inference detection module 535 may map that to a field created by a package named DSCORGPKG. The inference detection module 535 may also maintain a map of known package names to companies (e.g., Salesforce, Marketo, Hubspot, DiscoverOrg). For example, a package named DISCOER-PKG corresponds to the company DiscoverOrg. Thus, when the inference detection module 535 discovers that a third-party system such as Salesforce communicates with a service named DiscoverOrg, an inference can be made that Salesforce may send personal data to and receive personal data from a DiscoverOrg system. Similarly, when the inference detection module 535 discovers that a third-party system such as Salesforce communicates with a service associated with Marketo, an inference can be made that Salesforce may send personal data to and receive personal data from a Marketo system.

For some implementations, the inference may be made based on a combination of field names and field contents. For example, when the inference detection module 535 discovers a field on a user object named something like "webinar", inference may be made that there is tracking of webinar attendance. In addition, when examining field values, the inference detection module 535 may be able to determine which webinar system (e.g., BrightTalk of San Francisco, Calif.) is used to provide the webinar.

For some implementations, the inference detection module 535 may be configured to examine log files available in a third-party system and make inferences about other third-party systems. The inference detection module 535 may also examine any other available data in a third-party system and make inferences about other systems. It may be noted that permission may be granted in order for the inference detection module 535 to use the API and to examine data to make the necessary inferences.

Figure 6:
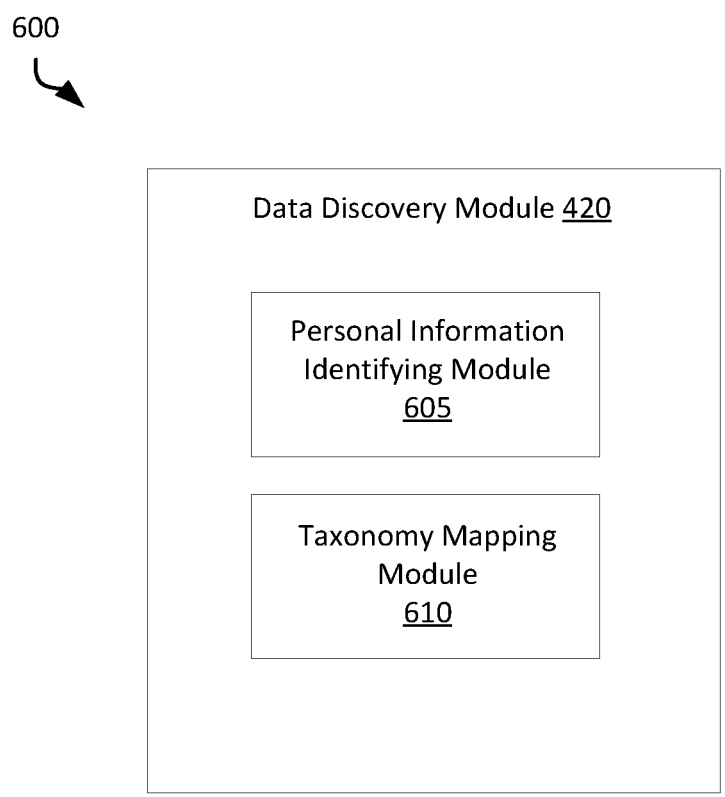
FIG. 6 shows an example diagram of a discovery module with its taxonomy mapping operations, in accordance with some implementations.

FIG. 6 shows an example diagram of a discovery module with its taxonomy mapping operations, in accordance with some implementations. When the third-party services associated with an entity have been identified, it may be necessary to determine whether the information communicated with the third-party services includes personal information. As shown in diagram 600, the determination may be performed by the personal information identifying module 605. It may be noted that operations of the personal information identifying module 605 may be dependent at least on how the personal information is defined by the current controlling regulation related to information privacy. For example, in California, the current controlling regulation is the CCPA that was signed into law on Jun. 28, 2018 and went into effect on Jan. 1, 2020. The operations of the personal information identifying module 605 may also be configured based on customer policies and risk tolerance acceptable by the customer. Once the information communicated with a third-party service is determined to include personal information, the information may be mapped using a taxonomy. This mapping operations may be performed by the taxonomy mapping module 610. For example, the information may include multiple datums, and one datum may be mapped to an IP address, another datum may be mapped to an email address, and another datum may be mapped to a GPS coordinate. It may be possible that, over time, the information communicated with a third-party service may change, and an existing mapping of a datum may need to be updated. When such a change occurs, the personal information identifying module 605 may be configured to communicate the change to the taxonomy mapping module 610 so the mapping can be updated. For example, a second datum in a data set may no longer reflect IP address but instead reflect a telephone number.

Figure 7A:
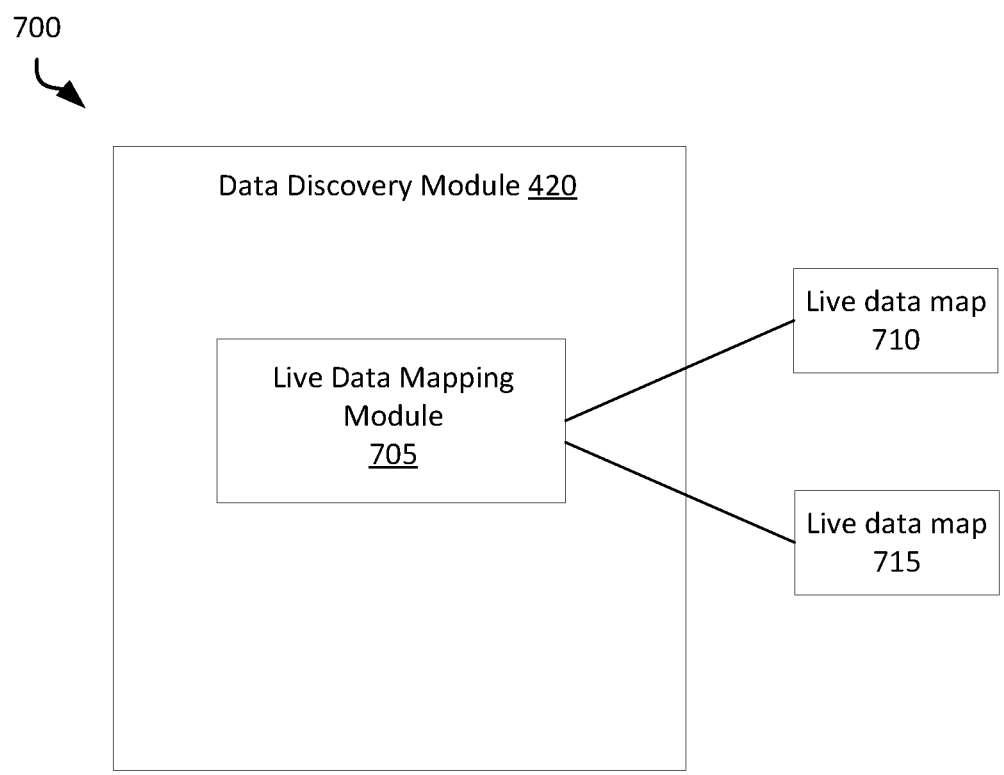
FIG. 7A shows an example diagram of a discovery module with live data mapping operations, in accordance with some implementations.

FIG. 7A shows an example diagram of a discovery module with live data mapping operations, in accordance with some implementations. As shown in diagram 700, live data mapping module 705 may be configured to generate and maintain a live data map 710 for an entity. The live data map may include information about where the entity and its associated third-party services may store personal information of customers of the entity. The live data mapping module 705 may be configured to generate and maintain a live data map for each of the entities that the information privacy compliance server 256 (shown in FIG. 3) is associated with. For example, the live data map 710 may be associated with one entity, and the live data map 715 may be associated with another entity.

The live data mapping module 705 may be configured to receive information discovered by the modules described with FIGS. 5A, 5B and 5C. The live data mapping module 705 may be configured to keep the live data maps 710, 715 updated as changes occur. Keeping the live data maps 710, 715 updated may help save time searching for the personal information to respond to verification requests. Keeping the live data maps 710, 175 updated may also help providing accurate verification reports. In addition, keeping the live data maps 710, 715 updated may help providing necessary disclosures per relevant laws.

The data discovery module 420 may be configured to use connectors (e.g., connector 355 shown in FIG. 3) to access personal information that may be stored in the third-party systems. A connector may be configured to provide a range of functionality including discovery of personal information and performing an access/deletion/update of personal information stored in a third-party server or system. A connector may also be configured to perform discovery of what other servers or systems a third-party server may integrate or communicate with. A connector may also be configured to determine data lineage of certain information (e.g., where the information come from if the information came from another system).

A connector may be configured to communicate via APIs directly to databases (or database-like systems) associated with third-party systems. There may be a connector for a third-party system, and there may be a connector for systems maintained by the entity.

A connector may also be configured to provide a layer of intelligence on top of the APIs and databases. For example, the connector 355 configured to connect to a third-party system (e.g., a system associated with Marketo, Inc. of San Mateo, Calif.) not only uses the APIs but may also infers what other systems Marketo integrates with. The inference may be performed by using a combination of APIs that don't directly provide the information to find the personal information. A connect may be configured to connect to various databases and infer where the personal information may be stored.

For some implementations, the data discovery module 420 may be associated with multiple connectors to communicate with multiple different third-party systems. For example, there may be one or more pre-built connector each for third-party system such as Okta, Salesforce, Marketo, Mailchimp and Hubspot. The data discovery module 420 may use the multiple connectors to determine where a third-party system stores personal information of customers of an entity.

FIG. 7B shows an example live data map, in accordance with some implementations. As shown in diagram 750, the live data map 710 may include information about third-party systems associated with an entity. In the current example, the third-party systems may include Okta, Marketo, NoreDink, AWS and MailChimp. The live data map 710 may include connection status information for each third-party system to indicate whether a connection is active or not active. The live data map 710 may include information to indicate whether personal information is found in a third-party system and the type of function or service that the third-party system offers. It may be noted that the live data map may also be configured to include other details relating to the personal information if the personal information is found stored by a third-party system. For example, the live data map may show the types of personal information found.

Figure 8A:
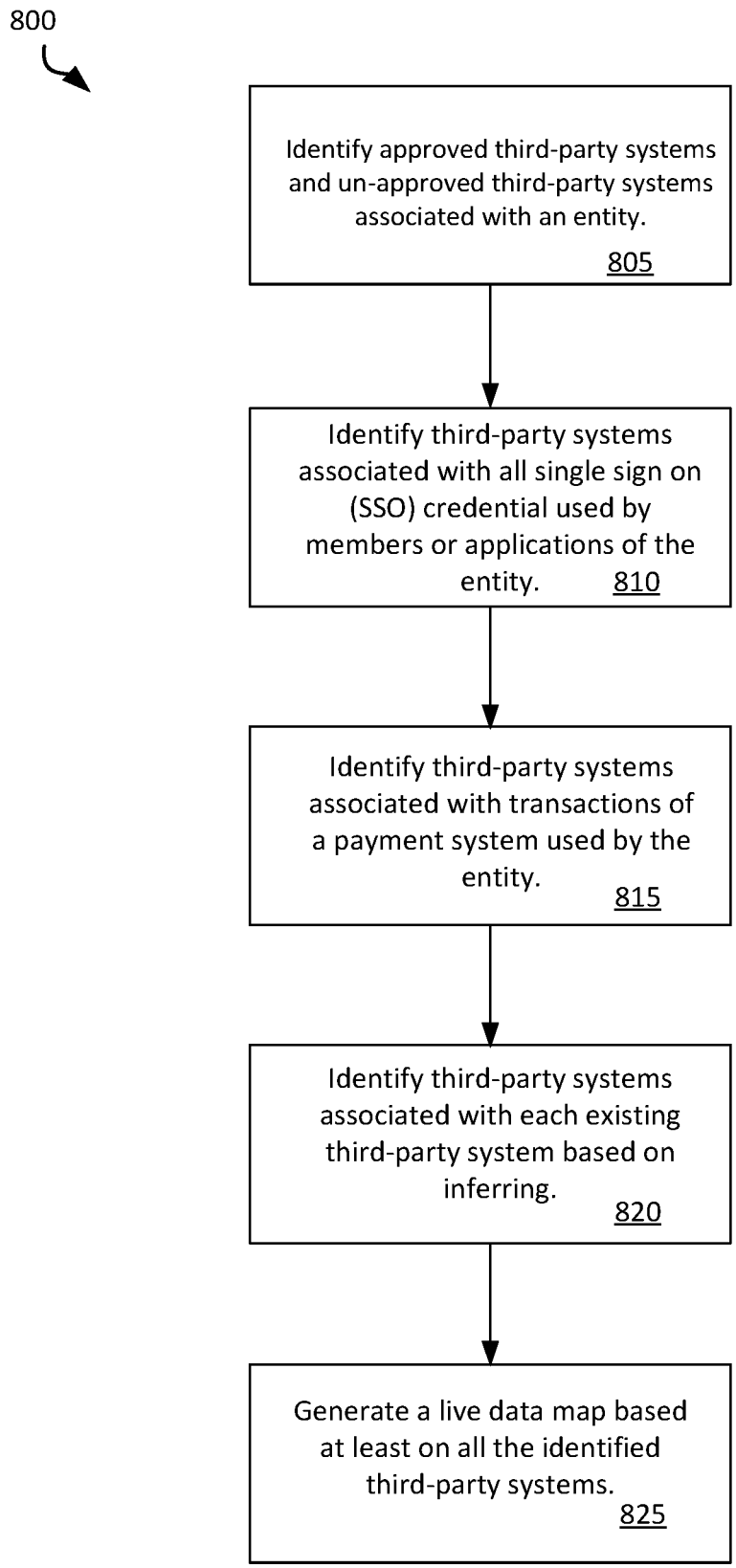
FIG. 8A is an example flow diagram of a process that may be used to identify third-party systems, in accordance with some implementations.

FIG. 8A is an example flow diagram of one process that may be used to identify third-party systems, in accordance with some implementations. The process shown in diagram 800 may be related to FIGS. 5A, 5B, 5C, 6, 7A and 7B and associated description. The process may be performed by one or more of the modules included in the data discovery module 420 to identify third-party systems associated with an entity with regard to personal information and information privacy.

At block 805, approved and unapproved third-party systems associated with an entity may be identified. Information about these third-party systems may be added to an inventory of all third-party systems associated with the entity.

At block 810, the third-party systems associated with all single sign on (SSO) credential used by members or applications of the entity may be identified. Information about these third-party systems may be added to the inventory of all third-party systems associated with the entity.

At block 815, the third-party systems associated with transactions of a payment system used by the entity may be identified. Information about these third-party systems may be added to the inventory of all third-party systems associated with the entity.

At block 820, inference may be used to identify third-party systems associated with each existing third-party system. For example, when one third-party system communicates with another third-party system, it may be inferred that both systems may exchange personal information. Information about these third-party systems may be added to the inventory of all third-party systems associated with the entity. It may be possible that the discovery of a third-party system may continue from a previously unknown third-party system. This may be performed repeatedly. For example, when a previously unknown third-party system "X" is discovered, the operations of block 820 may examine the data within the third-party system "X" and may potentially discover a third-party system "Y", and from the third-party system "Y", a third-party system "Z" may be discovered.

At block 825, the inventory of all the third-party systems associated with the entity may be used to generate a live data map. An example of a live data map is described with FIG. 7B. It may be possible that not all of the third-party systems included in a live data map may include personal information as related to information privacy.

Figure 8B:
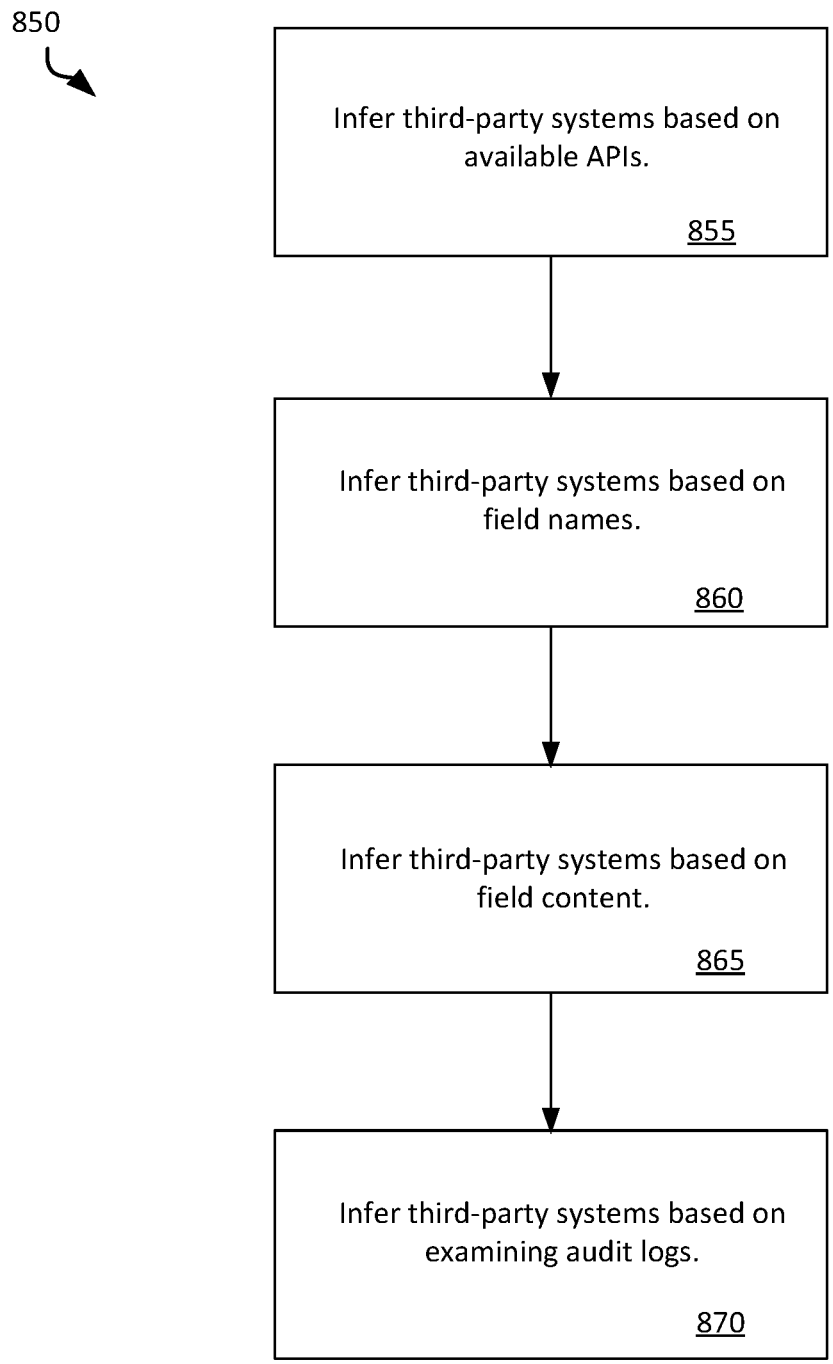
FIG. 8B is an example flow diagram of a process that may be used with factors to infer third-party systems, in accordance with some implementations.

FIG. 8B is an example flow diagram of a process that may be used with factors to infer third-party systems, in accordance with some implementations. The process shown in diagram 850 may be related to FIG. 5C and associated description. The process may be performed by the inference detection module 535.

At block 855, inference about a third-party system may be made based on available API support. For example, when a plugin or package (such as DiscoverOrg package) associated with a third-party system is supported or used by an entity server (e.g., entity server 255 shown in FIG. 3), an inference can be made that the entity uses the service and exchanges data with the third-party system.

At block 860, inference about a third-party system may be made based on named fields. For example, when an object includes a named field such as DiscoverOrg_Company_HQ_Address, then an inference can be made that communication and data exchange may exist with a third-party system associated with DiscoverOrg.

At block 865, inference about a third-party system may be made based on content of a named field. For example, when a content of a named field includes a name of a third-party service, then an inference can be made that communication and data exchange may exist with a third-party system associated with that service.

At block 870, inference about a third-party system may be made based on examining audit logs. For example, when an audit log indicates synchronization occurs with a third-party system, then an inference can be made that communication and data exchange may exist with the third-party system. It may be noted that, even when an inference is made about a third-party system, operations may still need to be performed by the personal information identifying module 605 (shown in FIG. 6) to verify whether personal information is exchanged with the third-party system.

Figure 8C:
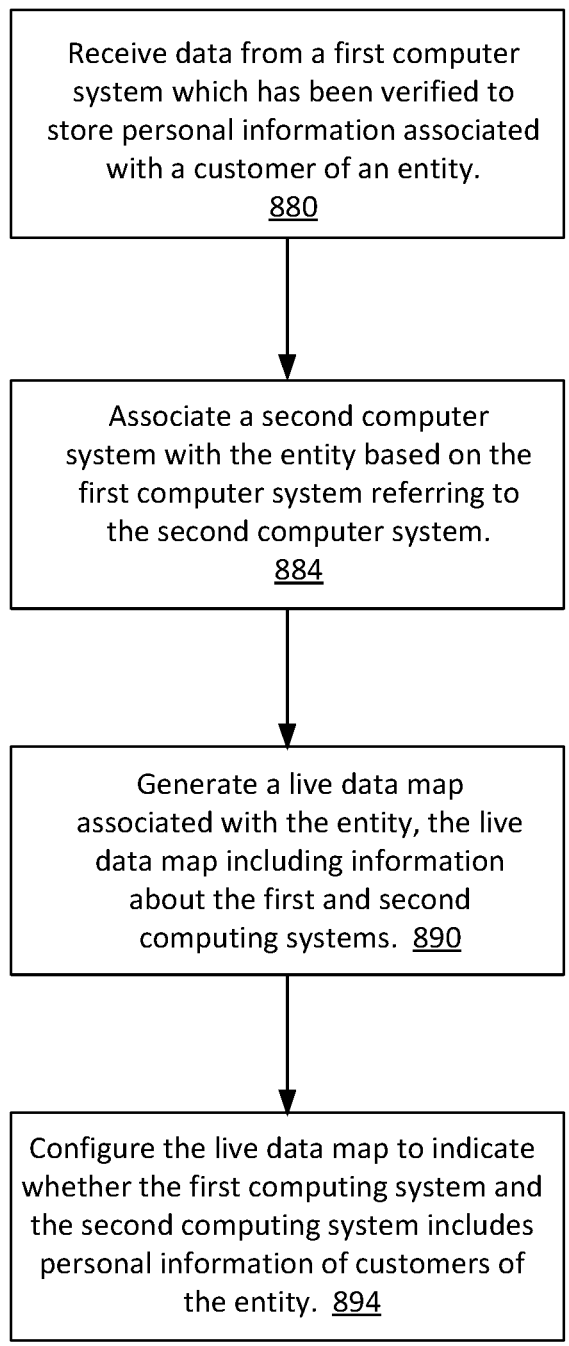
FIG. 8C is an example flow diagram of an inferring process, in accordance with some implementations.

FIG. 8C is an example flow diagram of an inferring process, in accordance with some implementations. The process shown in diagram 875 may be performed by the information privacy compliance server 256 (shown in FIG. 3). At block 880, data may be received from a first computer system which has been verified to store personal information associated with a customer of an entity. At block 884, a second computer system may be associated with the entity based on the first computer system referring to the second computer system. For example, data may be discovered from the first computing system showing that the first computing system uses an API to communicate with the second computing system. At block 890, a live data map associated with the entity may be generated, the live data map including information about the first and second computing systems. At block 894, the live data map may be configured to indicate whether the first computing system and the second computing system includes personal information of customers of the entity. The live data map may then be used to generate the verification reports.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method for discovering data related to information privacy, the method comprising:
   receiving, by a server computing system, data from a first computing system associated with an entity, the first computing system storing personal information of customers of the entity;
   discovering, by the server computing system, a second computing system based on the data from the first computing system referencing the second computing system;
   determining, by the server computing system, whether the second computing system stores the personal information of the customers of the entity;
   associating, by the server computing system, the second computing system with the entity;
   generating or updating, by the server computing system, a live data map associated with the entity to identify the first computing system and the discovered second computing system and include at least information about whether the first computing system and the second computing system store the personal information of the customers of the entity; and
   providing data map data to a device, the data map data configured to be processed to display or update a presentation of the live data map.

2. The method of claim 1, further comprising:
analyzing, by the server computing system, the data from the first computing system to identify a reference to the second computing system.

3. The method of claim 2, wherein analyzing the data from the first computing system comprises determining whether the data from the first computing systems references an application programming interface (API) that enables the first computing system to communicate with the second computing system.

4. The method of claim 2, wherein analyzing the data from the first computing system comprises determining whether the data from the first computing system references a named service associated with the second computing system.

5. The method of claim 4, wherein determining whether the data from the first computing system references a named service associated with the second computing system is based on one or more of a field name or a field content.

6. The method of claim 2, wherein the data from the first computing system includes an audit log, and wherein analyzing the data from the first computing system comprises determining whether the audit log references communication between the first computing system and the second computing system.

7. The method of claim 1, wherein updating, by the server computing system, the live data map comprises reflecting a change to the information about whether the first computing system and the second computing system store the personal information.

8. The method of claim 1, further comprising:
sending a notification to a client device, the notification indicating that the second computing system has been discovered.

9. The method of claim 1, wherein the live data map is further configured to include information about one or more of: whether personal information has been found, whether one or more second computing systems are connected, or one or more functions of the one or more second computing systems.

10. The method of claim 1, wherein the first computing system is verified to store personal information of customers of an entity.

11. The method of claim 1, further comprising:
generating, by the server computing system, verification reports associated with the entity based on the live data map.

12. The method of claim 1, further comprising:
automating a privacy request associated with the personal information of the customers of the entity, the privacy request associated with privacy compliance and actionable governance.

13. The method of claim 1, wherein the live data map is further configured to include information about data subjects and owners.

14. The method of claim 1, wherein the entity is a company, and the personal information is stored within one or more data systems of the company.

15. The method of claim 1, wherein the entity is an organization, and the live data map is configured to provide management of a data inventory of the organization.

16. The method of claim 1, wherein discovering the second computing system is performed using, at least in part, one or more connected plugins.

17. A system for discovering data related to information privacy comprising:
one or more processors; and
a non-transitory computer readable medium storing a plurality of instructions, which when executed, cause the one or more processors of a server computing system to:
process data from a first computing system associated with an entity, the first computing system storing personal information of customers of the entity;
discover a second computing system based on the data from the first computing system referencing the second computing system;
determine whether the second computing system stores the personal information of the customers of the entity;
associate the second computing system with the entity;
generate or update a live data map associated with the entity to identify the first computing system and the discovered second computing system and include at least information about whether the first computing system and the second computing system store the personal information of the customers of the entity; and
provide data map data to a device, the data map data configured to be processed to display or update a presentation of the live data map.

18. The system of claim 17, further comprising instructions to:
analyze the data from the first computing system to identify a reference to the second computing system.

19. The system of claim 18, wherein analyzing the data from the first computing system comprises determining whether the first computing systems references an application programming interface (API) that enables the first computing system to communicate with the second computing system.

20. The system of claim 18, wherein analyzing the data from the first computing system comprises determining whether the data from the first computing system references a named service associated with the second computing system.

21. The system of claim 20, wherein the determining whether the data from the first computing system references a named service associated with the second computing system is based on one or more of a field name or a field content.

22. The system of claim 18, wherein the data from the first computing system includes an audit log, and wherein analyzing the data from the first computing system comprises determining whether the audit log references communication between the first computing system and the second computing system.

23. The system of claim 17, wherein updating the live data map comprises reflecting a change to the information about whether the first computing system and the second computing system store the personal information.

24. The system of claim 17, further comprising instructions to:
send a notification to a client device, the notification indicating that the second computing system has been discovered.

25. The system of claim 17, wherein the live data map is further configured to include information about one or more of: whether personal information has been found, whether one or more second computing systems are connected, or one or more functions of the one or more second computing systems.

26. The system of claim 17, wherein the first computing system is verified to store personal information of customers of an entity.

27. The system of claim 17, further comprising instructions to:
generate verification reports associated with the entity based on the live data map.

28. The system of claim 17, further comprising instructions to:
  automate a privacy request associated with the personal information of the customers of the entity, the privacy request associated with privacy compliance and actionable governance.

29. The system of claim 17, wherein the live data map is further configured to include information about data subjects and owners.

30. The system of claim 17, wherein the entity is a company, and the personal information is stored within one or more data systems of the company.

31. The system of claim 17, wherein the entity is an organization, and the live data map is configured to provide management of a data inventory of the organization.

32. The system of claim 17, wherein discovering the second computing system is performed using, at least in part, one or more connected plugins.

33. A computer program product for discovering data related to information privacy, the computer program product comprising a non-transitory computer-readable medium storing computer-readable program code to be executed by one or more processors, the program code comprising instructions to:
  process data from a first computing system associated with an entity, the first computing system storing personal information of customers of the entity;
  discover a second computing system based on the data from the first computing system referencing the second computing system;
  determine whether the second computing system stores the personal information of the customers of the entity;
  associate the second computing system with the entity;
  generate or update a live data map associated with the entity to identify the first computing system and the discovered second computing system and include at least information about whether the first computing system and the second computing system store the personal information of the customers of the entity; and
  provide data map data to a device, the data map data configured to be processed to display or update a presentation of the live data map.

34. The computer program product of claim 33, further comprising instructions to:
  analyze the data from the first computing system to identify a reference to the second computing system.

35. The computer program product of claim 34, wherein analyzing the data from the first computing system comprises determining whether the first computing systems references an application programming interface (API) that enables the first computing system to communicate with the second computing system.

36. The computer program product of claim 34, wherein analyzing the data from the first computing system comprises determining whether the data from the first computing system references a named service associated with the second computing system.

37. The computer program product of claim 36, wherein determining whether the data from the first computing system references a named service associated with the second computing system is based on one or more of a field name or a field content.

38. The computer program product of claim 34, wherein the data from the first computing system includes an audit log, and wherein analyzing the data from the first computing system comprises determining whether the audit log references communication between the first computing system and the second computing system.

39. The computer program product of claim 33, wherein updating the live data map comprises reflecting a change to the information about whether the first computing system and the second computing system store the personal information.

40. The computer program product of claim 33, further comprising instructions to:
  send a notification to a client device, the notification indicating that the second computing system has been discovered.

41. The computer program product of claim 33, wherein the live data map is further configured to include information about one or more of: whether personal information has been found, whether one or more second computing systems are connected, or one or more functions of the one or more second computing systems.

42. The computer program product of claim 33, wherein the first computing system is verified to store personal information of customers of an entity.

43. The computer program product of claim 33, further comprising instructions to:
  generate verification reports associated with the entity based on the live data map.

44. The computer program product of claim 33, further comprising instructions to:
  automate a privacy request associated with the personal information of the customers of the entity, the privacy request associated with privacy compliance and actionable governance.

45. The computer program product of claim 33, wherein the live data map is further configured to include information about data subjects and owners.

46. The computer program product of claim 33, wherein the entity is a company, and the personal information is stored within one or more data systems of the company.

47. The computer program product of claim 33, wherein the entity is an organization, and the live data map is configured to provide management of a data inventory of the organization.

48. The computer program product of claim 33, wherein discovering the second computing system is performed using, at least in part, one or more connected plugins.

* * * * *